United States Patent

[11] 3,542,401

| [72] | Inventor | Maurice J. Forkert<br>3630 W. State St., Fort Wayne, Indiana 46808 |
|---|---|---|
| [21] | Appl. No. | 835,997 |
| [22] | Filed | June 24, 1969 |
| [45] | Patented | Nov. 24, 1970 |

[54] QUICK HITCH DEVICE
3 Claims, 8 Drawing Figs.

[52] U.S. Cl. .................................................. 280/504
[51] Int. Cl. ...................................................... B60d 1/00
[50] Field of Search ........................................... 280/504,
497, 508, 509, 456; 287/95, 189.36; 280/510, 511

[56] References Cited
UNITED STATES PATENTS

| 707,386 | 8/1902 | Carter | 287/95 |
| 740,527 | 10/1903 | Carter | 287/95 |
| 2,221,492 | 11/1940 | Sawyer | 280/504 |
| 3,298,724 | 1/1967 | Coleman et al. | 280/497 |
| 3,421,779 | 1/1969 | Shelby | 280/515 |

*Primary Examiner*—Leo Friaglia
*Assistant Examiner*—Robert R. Song
*Attorney*—Arthur J. Hansmann ABSTRACT: A quick hitch device including a first member having a pin-receiving socket, and a second member having a pin which is movable into and out of the socket so that the two members can be connected and disconnected relative to each other. A latch is rotatable on the first member, and a portion of the latch is snugly disposed within the socket, and the latch also includes a handle for rotating the latch portion received in the socket so that the pin can be releasably retained in the socket on the first member. The socket and the latch portion therein are both circularly shaped for rotation of the latch in the socket to provide maximum leverage and holding force relative to the pin.

Patented Nov. 24, 1970
3,542,401
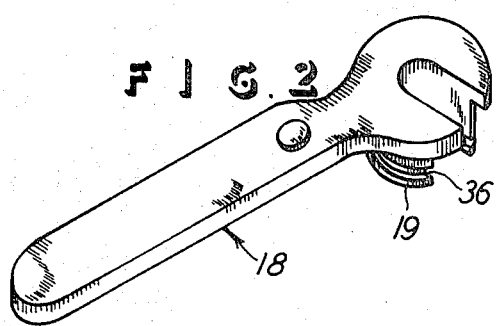
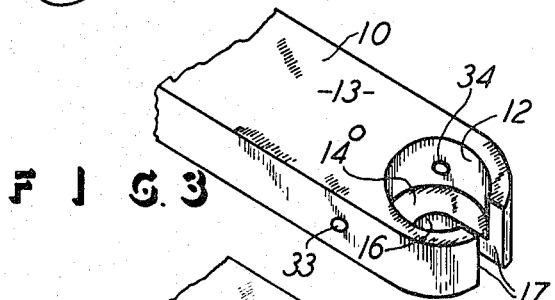
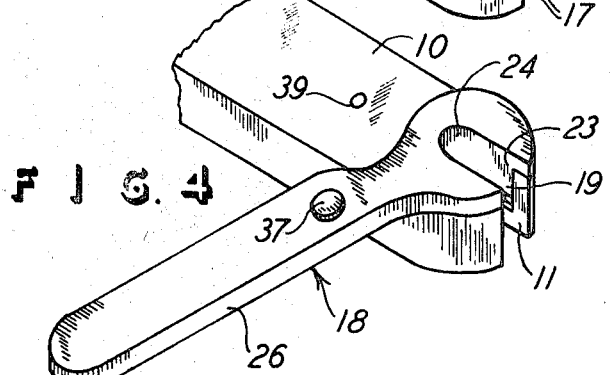
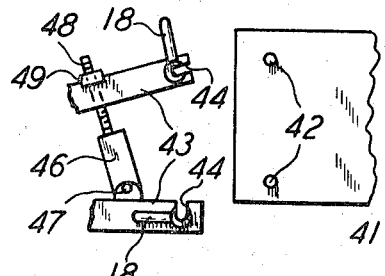
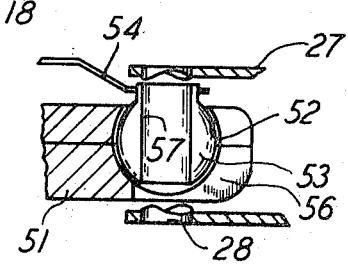
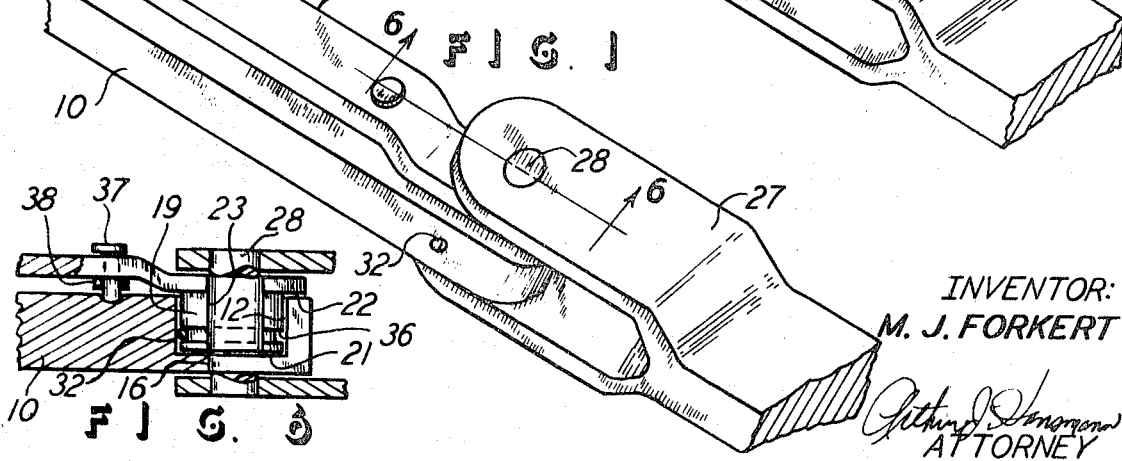
INVENTOR:
M. J. FORKERT
ATTORNEY

3,542,401

QUICK HITCH DEVICE

QUICK HITCH DEVICE

This invention relates to a quick hitch device of the type including one member having a socket and another member having a pin which is releasably received in the socket, so the two members may be connected and disconnected relative to each other. This invention has particular application in hitching implements to a tractor, such as a wagon tongue to a tractor drawbar, and such as a backhoe implement to a tractor, and such as coupling a truck tailgate into its latched hauling position, and like applications where two members are to be readily and easily joined together, with one member having a pin and the other member having a socket for receiving the pin and also having a latch securing the pin in latched position.

BACKGROUND OF THE INVENTION

Hitch or coupling devices utilizing a lever type of rotatable latch which receives a pin for joining two members together, are old devices and are well known in the art. Devices of this general description or feature are known in the machinery, tool, and implement arts. For instances, U.S. Pat. No. 3,298,724 shows the use of a notched latch member for securing a backhoe to a tractor. U.S. Pat. No. 2,221,492, for example, shows the use of a notched member with a latch for hitching a wagon to a tractor. More generally, U.S. Pat. No. 740,527, for example, shows a coupling having two rotatable parts for latching onto a pin.

In the general and various arts of securing two pieces of equipment together, such as the relatively heavy pieces referred to in the examples mentioned, it is of concern that the two pieces be readily and easily latched together in a sturdy and secure manner. That is, the latching pieces must be sufficiently sturdy to withstand the forces acting on the implements and like machinery involved, but the latching pieces must also be sufficiently manipulable for quick attachment and detachment of the implement pieces. Further, it is a problem in the art of latches or couplers, and particularly where heavy equipment is involved, such as that described, that the latching parts having a pin and a receiving socket or slot be capable of ready alignment and movement to the secured position. That is, there is a problem and concern relating to the ease of positioning the pin within the slot and then latching or securing the pin therewithin. In many instances, the latching members require extended effort and tedious care for alignment and final latching of the pin in the slot, and this is particularly true where heavy equipment is involved and it is difficult to move the latching parts relative to each other.

Accordingly, it is a primary object of this invention to provide a quick hitch device wherein the parts to be hitched together can be readily and easily maneuvered into final secured position, all accomplished with a minimum of time and effort. Further, it is significant that the latched parts be secure and capable of withstanding large forces, without damage to the parts and without upsetting the relationship of the parts for the quick and easy latching mentioned.

Another object of this invention is to accomplish the aforementioned features, and to overcome the problems of the art, as mentioned above, but to do so with a resulting coupling device which permits desired articulate movement between the two parts coupled together, such as pivotal movement about the coupling pin.

A more specific object of this invention is to provide a hitch or coupling device for heavy equipment, and wherein the device provides a camming action, or a high mechanical advantage in the form of a lever in the accomplishment of hitching the two parts together.

SUMMARY OF THE INVENTION

This invention relates to a quick hitch device which has a first member with a socket for rotatably receiving a latch with a handle. A second member carries a pin movable into and out of the socket, and the latch has a slot aligned with a slot extending through the first member and into the socket such that when the pin is in the slots, the latch can be pivoted by rotating it in the socket to bring the pin into the depth of the socket and secure it therein. The socket and the mating latch portion are circularly shaped, in one instance being cylindrical and in another instance being spherical, and the latch is retained on the first member by surfaces which define the circular shape of the socket. The device is utilized in implements, including a backhoe carrying the pin and a tractor carrying the latch, such that the pin and latch can be mated and secured together. Also, a tractor and a wagon can be hitched together by the latch and pin parts respectively located on these implements.

BRIEF DESCRIPTION OF THE DRAWINGS

FIG. 1 is a perspective view of a preferred embodiment of this invention

FIG. 2 is a perspective view of the latch shown in FIG. 1.

FIG. 3 is a perspective view of a portion of that shown in FIG. 1.

FIG. 4 is a perspective view of the assembly of the parts shown in FIGS. 2 and 3.

FIG. 5 is a perspective view of a part shown in FIG. 1.

FIG. 6 is a sectional view taken along the line 6–6 of FIG. 1.

FIG. 7 is a side elevational view of a portion of a backhoe frame and a portion of tractor hitch or liftarms having the latch members shown in FIG. 1.

FIG. 8 is a sectional view of another embodiment of the device shown in FIG. 1, and with the sectional view being similar to that shown in FIG. 6.

DETAILED DESCRIPTION OF THE PREFERRED EMBODIMENTS

As mentioned, U.S. Pat. No. 3,298,724 has a disclosure of a quick hitch or coupling mechanism for which the present invention can be substituted with certain advantages resulting therefrom. Thus the said patent shows a backhoe and a tractor, and such showing is somewhat similar to that indicated in FIG. 7 in the instant invention, and that patent shows latches connectable to pins on the backhoe frame. To this extent, the present invention is related, and it will therefore be understood that the present invention involves quick hitching devices useful in the agricultural implement line and including the hitching of backhoes to tractors, wagons to tractors, tailgates on trucks, and like heavy equipment applications.

A first member 10 is provided with an open end slot 11 leading into a cylindrically shaped socket 12 which of course is circular and is shown to extend to the top surface 13 of the member 10. The socket 12 also extends to and is defined by the surface or wall 14. The slot 11 extends into the member 10 and terminates in the semicircular wall 16 which is coaxial with the axis of the cylindrically shown socket 12. Thus the side walls or surfaces 17 defining the slot 11 extend tangentially from the semicircular wall 16.

A latch 18 has a circular portion 19 which is snugly rotatably received in the socket 12, and in the embodiment shown in FIGS. 1 through 6, the socket 12 is cylindrical, as mentioned, and therefore the latch portion 19 is also cylindrical. The portion 19 has a bottom surface 21 disposed adjacent the wall 14 defining the socket 12, and the latch has a surface 22 overlying the portion of the surface 13 surrounding the socket 12. Thus the latch 18 is restricted in its movement downwardly in the socket 12, in the position shown in FIG. 6, for instance. The latch portion 19 has a pin-receiving slot 23 which extends from the exterior of the portion 19 and into the interior thereof where it terminates in the semicircular wall 24. Thus again it will be noted that the slot 23 is tangential with the semicircular wall 24, and also it will be understood that the axis of the semicircular wall 24 is aligned with the axis of the socket 12, and it is therefore also aligned with the axis of the semicircular wall 16 in the member 10. Further, the width of the pin-receiving slot 23 is the same as the width of the slot 11 in the member 10, and the two can therefore be aligned and are coextensive, as shown in FIG. 4. The latch 18 also includes a handle portion 26 which is integral with and extends from the circular portion 19, but the handle portion 26 is shown to be at least several times as long as the diameter of the portion 19. With this arrangement, there is substantial leverage or mechanical advantage in the rotation of the latch 18 on the member 10 since the outer walls of the portion 19 rotate in contact with the walls defining the socket 12, and such walls are located immediately adjacent the axis of the socket 12 and the semicircular walls 24 and 16, as described.

It will of course then also be understood that another member 27 carries a pin 28 which is of a diameter substantially the same as the size of the slots 11 and 23 and also then the radius of the pin 28 is substantially the same as the radius of the semicircular walls 16 and 24. Therefore, when the members 10 and 27 are placed in the hitched position shown in FIG. 1, the pin 28 is movably received in the socket 12 and the slots 11 and 23. However, while the pin 28 cannot move radially, it can rotate about its axis so that the members 10 and 27 can pivot relative to each other and about the axis of the pin 28, as desired. Therefore, it will be understood that the members 10 and 27 may be two members of equipment parts, such as the member 10 may be a tractor drawbar and the member 27 may be a wagon tongue of a clevis shown having the two arms 29 and 31 which contain the pin 28 in fixed position on the arms 29 and 31. With the hitch device shown, it will therefore be understood that mere placement of the pin 28 within reach of the slots 11 and 23 will permit the operator to rotate the latch 18 and thereby draw the pin 28 into its seated position immediately adjacent or in abutment with the wall 16 and therefore also adjacent the wall 24, in the final latch position of FIGS. 1 and 6. This is true because of the high leverage or mechanical advantage provided by this quick hitch in that the latch 18 is rotatable in the socket 12, and therefore the fulcrum point of rotation is provided close to the pin 28 for this maximum leverage.

To retain the latch 18 from moving upwardly and out of the socket 12, a pin 32 is affixed to the member 10 by extending into aligned openings 33 and 34 shown in FIG. 3 in the member 10. This causes the pin 32 to pass through the socket 12, as shown in FIG. 6. The latch circular portion 19 has a groove 36 extending therearound, and the pin 32 is received in the groove 36 for permitting latch rotation while retaining the latch on the member 10, as mentioned.

Also, a pin 37 is mounted on the latch 18 and is movable thereon under the influence of a spring 38, and the pin can be received in a depression 39 in the member 10 to thereby hold the latch 18 in the secured or latched position shown in FIGS. 1 and 6. With this arrangement shown, there are no loose parts, and the entire structure is self-contained and cannot be inadvertently disassembled, so the parts will always be available for use when desired, and the structure is arranged for securely holding the two members together by retaining the pin 28 in the base or at the semicircular walls of the slots 11 and 23.

As mentioned, FIG. 7 shows the application of the embodiment shown in FIGS. 1—6, and here it will be seen that a backhoe frame 41 carries two spaced-apart pins 42. Tractor support arms 43 are understood to be extending from a tractor which is not shown, and these arms may be relatively movable toward and away from each other, and this may be accomplished by having the upper arm pivotal up and down while the lower arm may be relatively fixed on the tractor. Latches 18 are shown on the arms 43, and these arms are therefore comparable to the member 10. Thus the arms 43 have slots 44, and the latches 18 have their slots 23 aligned with the arm slots 44, as described and for the purposes mentioned. Thus the slots 44 and 23 can be aligned with the pins 42 for receiving the pins when the arms 43 are properly positioned. Thus the lower arm 43 would receive the lower pin 42 by moving upwardly onto the pin 42, and the upper arm 43 would receive the upper pin 42 by moving horizontally onto the pin 42. Rotation of the two latches 18 will then lock the arms 43 with the pins 42, as desired. An adjustable brace 46 is connected between the arms 43, by being pivotal on the lower arm about the pin 47, for instance, and by threadedly connecting through a threaded end 48 to a nut 49 affixed to the upper arm 43. In this manner, the arms 43 can be pivotally adjusted and then secured together by the brace 46 when they are latched in position on the pins 42. The entire arrangement provides for quick hitch of a tractor to a backhoe, and the hitch is secure and sturdy, and the mechanical advantage or leverage attainable with the latch permits the easy and quick attachment which is the object of this invention.

FIG. 8 shows another embodiment of the latch and its supporting member. In this instance, the supporting member is designated 51, and it has its circularly shaped pocket defined by the spherical walls 52, so that the pocket is spherical. Correspondingly, the latch has a spherical portion 53 snugly received in the pocket 52, so that the latch portion 53 cannot move out of the pocket. In order to provide this spherical pocket 52 and the assembly of the sphere 53 therewithin, the drawing shows that the member 51 is made in an upper portion and a lower portion. Also, the latch has a handle 54 which is assembled with the spherical portion 53, and the handle extends upwardly away from the member 51 for a reason mentioned later. Finally, the member 51 has an open end slot 56, similar to and comparable to the slot 11 in the member 10.

With the spherical relationship described, it will be understood that there can be movement between the members 51 and 27 about the axis of the pin 28, but there can be additional movement between the members 51 and 27 in the plane of the longitudinal extent of these members, and that is the plane of the paper on which these members are drawn in FIG. 8. Therefore, there is a universal type of action between the members 51 and 27, although the members are held securely together for purposes of towing a trailer by a tractor, or for other hitch structures mentioned herein. That is, for the embodiment shown in FIG. 8, the slot 56 may be relatively larger than the diameter of the pin 28 so that the pin can move in the plane mentioned, and, in fact, the pin then could also move in a transverse plane, since the pin would only be limited by the very short height of the stock in the member 51 where it defines the slot 56 and is adjacent the bottom end of the pin 28. Nevertheless, the spherical member 53 has a slot 57 which snugly receives the pin 28, and, in turn, the spherical portion 53 is itself snugly received in the spherical pocket 52, so the pin is secure and tightly held, but the universal action is possible.

I claim:

1. A quick hitch device of the type including a first member having a socket, a second member, a pin on said second member and being received in said socket and being movable into and out of said socket for connecting and disconnecting said members, a latch rotatable on said first member and having a pin-receiving slot alignable with said socket on said first member for receiving said pin and being movable to a position out of alignment with said socket on said first member for locking said pin onto said first member, the improvement comprising said socket on said first member having a cylindrically shaped section and having an elongated section extending from said cylindrically shaped section and in a direction to the exterior of said first member, said latch including a cylindrically shaped portion snugly rotatably received in said cylindrically shaped section of said socket, said socket being defined by walls disposed coextensive with said cylindrically shaped portion to retain said cylindrically shaped portion snugly within said socket, said pin-receiving slot being located in said cylindrically shaped portion and being coextensive and alignable with said elongated section of said socket for passing said pin along said slot and along said elongated section of said socket, said first member having a wall defining one end of said cylindrical shape of said socket, and said latch having a shoulder adjacent the other end of said cylindrical shape of said socket, and with said shoulder overlying said first member for retaining said cylindrically shaped portion of said latch axially aligned with said socket, said portion being rotatable in said socket to have said slot rotatable out of alignment with said elongated section of said socket for locking said pin onto said first member, said latch including a handle integral with said cylindrically shaped portion and extending therefrom in a length at least several times as long as the diameter of said cylindrically shaped portion.

2. A quick hitch device of the type including a first member having a socket, a second member, a pin on said second member and being received in said socket and being movable into and out of said socket for connecting and disconnecting said members, a latch rotatable on said first member and having a pin-receiving slot alignable with said socket on said first member for receiving said pin and being movable to a position out of alignment with said socket on said first member for locking said pin onto said first member, the improvement comprising said socket on said first member having a cylindrically shaped section and having an elongated section extending from said cylindrically shaped section and in a direction to the exterior of said first member, said latch including a cylindrically shaped portion snugly rotatably received in said cylindrically shaped section of said socket, said socket being defined by walls disposed coextensive with said cylindrically shaped portion to retain said cylindrically shaped portion snugly within said socket, said pin-receiving slot being located in said cylindrically shaped portion and being coextensive and alignable with said elongated section of said socket for passing said pin along said slot and along said elongated section of said socket, said cylindrically shaped portion of said latch has a groove extending therearound, a pin on said first member and extending across said cylindrical shape of said socket and into said groove for axially retaining said cylindrically shaped portion in said cylindrical shape of said socket, said portion being rotatable in said socket to have said slot rotatable out of alignment with said elongated section of said socket for locking said pin onto said first member, said latch including a handle integral with said cylindrically shaped portion and extending therefrom in a length at least several times as long as the diameter of said cylindrically shaped portion.

3. A quick hitch device of the type including a first member having a socket, a second member, a pin on said second member and being received in said socket and being movable into and out of said socket for connecting and disconnecting said members, a latch rotatable on said first member and having a pin-receiving slot alignable with said socket on said first member for receiving said pin and being movable to a position out of alignment with said socket on said first member for locking said pin onto said first member, the improvement comprising said socket on said first member having a cylindrically shaped section and having an elongated section extending from said cylindrically shaped section and in a direction to the exterior of said first member, said latch including a cylindrically shaped portion snugly rotatably received in said cylindrically shaped section of said socket, said socket being defined by walls disposed coextensive with said cylindrically shaped portion to retain said cylindrically shaped portion snugly within said socket, said pin-receiving slot being located in said cylindrically shaped portion and being coextensive and alignable with said elongated section of said socket for passing said pin along said slot and along said elongated section of said socket, said first member having a wall defining one end of said cylindrical shape of said socket, and said latch having a shoulder adjacent the other end of said cylindrical shape of said socket, and with said shoulder overlying said first member for retaining said cylindrically shaped portion of said latch axially aligned with said socket, said cylindrically shaped portion of said latch has a groove extending therearound, a pin on said first member and extending across said cylindrical shape of said socket and into said groove for axially retaining said cylindrically shaped portion in said cylindrical shape of said socket, said portion being rotatable in said socket to have said slot rotatable out of alignment with said elongated section of said socket for locking said pin onto said first member, said latch including a handle integral with said cylindrically shaped portion and extending therefrom in a length at least several times as long as the diameter of said cylindrically shaped portion.